(12) United States Patent
Karogal et al.

(10) Patent No.: US 12,515,672 B2
(45) Date of Patent: Jan. 6, 2026

(54) TECHNIQUES FOR BLENDING IN MECHANICAL FRICTION BRAKES DURING DECLERATION FOR HYBRID VEHICLE WITH ELECTRIC MOTOR MECHANICALLY COUPLED TO TRANSMISSION GEARS

(71) Applicant: FCA US LLC, Auburn Hills, MI (US)

(72) Inventors: Indrasen Karogal, Auburn Hills, MI (US); Gaurav Sadekar, Farmington Hills, MI (US); Nadirsh Patel, Farmington Hills, MI (US); Dario Morina, Turin (IT); Alessandro Lelli, Turin (IT); Giuseppe Corallo, Turin (IT); Pier Luca Di Gristina, Turin (IT); Paolo Olivieri, Pecello Torinese (IT); Xin Diao, Pleasant Ridge, MI (US); Federico de Bosio, Turin (IT)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/432,665

(22) Filed: Feb. 5, 2024

(65) Prior Publication Data
US 2024/0262365 A1    Aug. 8, 2024

Related U.S. Application Data

(60) Provisional application No. 63/483,615, filed on Feb. 7, 2023.

(51) Int. Cl.
*B60W 30/19* (2012.01)
*B60W 10/113* (2012.01)
(Continued)

(52) U.S. Cl.
CPC .......... *B60W 30/19* (2013.01); *B60W 10/113* (2013.01); *B60W 10/184* (2013.01);
(Continued)

(58) Field of Classification Search
CPC .... B60W 10/08; B60W 10/13; B60W 10/184; B60W 10/196; B60W 30/19;
(Continued)

(56) References Cited

U.S. PATENT DOCUMENTS

6,126,251 A * 10/2000 Yoshii ................. B60W 10/184
303/152
7,976,427 B2 * 7/2011 Yamamoto ............ B60W 10/06
477/4
(Continued)

*Primary Examiner* — Roger L Pang
(74) *Attorney, Agent, or Firm* — Jeremy J. Klobucar (57) ABSTRACT

An electrified vehicle includes a transmission having shiftable gears, an electric motor coupled for common therewith, and a synchronizer controllable for coupling the transmission to a driveline; friction brakes; a control system including a hybrid control unit, a brake control unit and a transmission control unit, wherein the hybrid control unit functions as a supervisory controller over the transmission control unit and the brake control unit and wherein the hybrid control unit is configured to coordinate control among the transmission control unit and brake control unit to compensate for unavailability of electric motor regeneration torque during an upcoming transmission gear shift event and blend in the friction brakes to provide a continuous and smooth deceleration of the electrified vehicle during the transmission shift event.

11 Claims, 6 Drawing Sheets

(51) Int. Cl.
*B60W 10/184* (2012.01)
*B60W 10/196* (2012.01)
*B60W 20/00* (2016.01)
*B60W 30/18* (2012.01)
*F16H 61/04* (2006.01)
*B60W 10/08* (2006.01)

(52) U.S. Cl.
CPC .......... *B60W 10/196* (2013.01); *B60W 20/00* (2013.01); *B60W 30/18127* (2013.01); *F16H 61/0403* (2013.01); *F16H 61/0437* (2013.01); *B60W 10/08* (2013.01); *B60W 2540/10* (2013.01); *B60W 2540/12* (2013.01); *B60W 2710/08* (2013.01); *B60W 2710/1005* (2013.01); *B60W 2710/18* (2013.01); *F16H 2061/0407* (2013.01); *F16H 2061/0496* (2013.01)

(58) Field of Classification Search
CPC ....... B60W 30/18127; B60W 2540/12; B60W 2710/1005; B60W 2710/18; B60W 20/40; B60W 2710/08
USPC ............................................. 477/4, 5, 9, 15
See application file for complete search history.

(56) References Cited

U.S. PATENT DOCUMENTS

| | | | |
|---|---|---|---|
| 2017/0232960 A1* | 8/2017 | Cho ...................... | B60K 6/387 477/9 |
| 2019/0054913 A1* | 2/2019 | Lad ........................ | B60W 20/00 |
| 2022/0048493 A1* | 2/2022 | Crisp ..................... | B60W 10/11 |
| 2025/0091580 A1* | 3/2025 | Ohnishi .............. | F16H 61/0204 |

* cited by examiner

TECHNIQUES FOR BLENDING IN MECHANICAL FRICTION BRAKES DURING DECLERATION FOR HYBRID VEHICLE WITH ELECTRIC MOTOR MECHANICALLY COUPLED TO TRANSMISSION GEARS

CROSS-REFERENCE TO RELATED APPLICATION(S)

The present application claims the benefit of U.S. Provisional Application No. 63/483,615, filed on Feb. 7, 2023. The disclosure of this application is incorporated herein by reference in its entirety.

FIELD

The present application generally relates to vehicles having an electric motor coupled to a gear transmission and, more particularly, to systems, methods and techniques for using mechanical friction brakes during deceleration or coasting in a vehicle having an electric motor mechanically coupled to one or more gears of a transmission.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In electrified vehicles having an electric traction motor, electric vehicle coasting and electric vehicle braking provide an opportunity for regenerative braking via the electric motor. For electrified vehicle architectures where transmission gears are mechanically connected to an electric motor that is used for regeneration, the electric regeneration is unavailable during gear shifts of such a hybrid transmission. During such gear shifts, electric vehicle braking or electric vehicle coasting is interrupted. As a result, there will not be continuous and smooth deceleration and the driver and/or vehicle occupants may notice the same and/or possibly feel a slight acceleration. Accordingly, while such conventional electrified vehicle regenerative braking systems and strategies do work for their intended purpose, there remains an opportunity for improvement in the relevant art.

SUMMARY

According to one example aspect of the invention, an electrified vehicle is provided. In one exemplary implementation, the electrified vehicle includes: a transmission including multiple shiftable gears, an electric motor coupled for common rotation therewith, and a synchronizer controllable to couple and decouple the transmission from wheels of the vehicle; friction brakes; a control system including a hybrid control unit (HCP), a brake control unit (BSM) and a transmission control unit (TCM), wherein the HCP functions as a supervisory controller over the TCM and the BSM; wherein the HCP is configured to coordinate control among the TCM and BSM to compensate for unavailability of electric motor regeneration torque during an upcoming transmission gear shift, including: based on determining the vehicle is in a coast condition, the HCP coordinates with the TCM to set a first level of electric motor regeneration torque in connection with the transmission being in an initial gear, the first level of electric motor regeneration torque being equal to a first level of total braking torque; based on a driver braking torque request being received: the HCP coordinates with the BSM to determine an amount of driver intended brake torque and the first level of total braking torque is increased by the determined amount of driver intended brake torque to a second level of total braking torque; the HCP coordinates with the TCM to raise a level of electric motor regeneration torque from the first level to a second level matching the second level of total braking torque; based upon a shift request being communicated by the TCM, the HCP: coordinates with the BSM and the TCM to ramp down the second level of electric motor regeneration torque while commanding a corresponding increase in friction brake torque to maintain the second level of total braking torque; and coordinates with the TCM to execute the upcoming gear shift from the initial gear to another gear of the second sub-transmission.

In some implementations, the transmission includes a dual clutch transmission having: first and second sub-transmissions having respective first and second clutches and first and second synchronizers, the first and second synchronizers being controllable to couple and decouple the respective first and second sub-transmissions from wheels of the vehicle; and the electric motor being rotationally coupled to the second sub-transmission for common rotation therewith; wherein the upcoming gear shift involves a gear of the second sub-transmission, and wherein the first level of electric motor regeneration torque is set in connection with the second sub-transmission being in an initial gear; and wherein the initial gear and the another gear are both in the second sub-transmission.

In some implementations, based upon a shift request being communicated by the TCM, the HCP: coordinates with the BSM and the TCM to ramp down the second level of electric motor regeneration torque to zero; and commands the second synchronizer to an open or neutral state to disconnect the second sub-transmission from the wheels to facilitate the upcoming gear shift.

In some implementations, the HCP coordinates the second synchronizer being commanded to the open or neutral state by the TCM once the second level of electric motor regeneration torque is ramped down to zero.

In some implementations, the HCP coordinates with the BSM and the TCM to command the increase in friction brake torque by the friction brakes to arrive at and maintain the second level of total braking torque at substantially a same time as the electric motor regeneration torque is ramped down to zero and the second synchronizer is commanded to the open or neutral state.

In some implementations, upon or after the upcoming gear shift from the initial gear to another gear is executed, the HCP coordinates with the BSM to ramp down the commanded friction brake torque to zero. In some implementations, after the upcoming gear shift from the initial gear to another gear is executed, the HCP coordinates with the TCM to command the second synchronizer to a closed state thereby coupling the second sub-transmission to the wheels.

In some implementations, the determining the vehicle is in a coast condition includes receiving a signal indicative of the gas pedal being released to a non-depressed state.

In some implementations, the determined driver intended brake torque is a function of a depression amount of a brake pedal of the vehicle.

In some implementations, the electrified vehicle is a mild hybrid electric vehicle. In some implementations, the electrified vehicle is a hybrid electric vehicle. In some implementations, the electrified vehicle is a battery electric vehicle.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

BRIEF DESCRIPTION OF THE DRAWINGS

The present disclosure will become more fully understood from the detailed description and the accompanying drawings, wherein.

DESCRIPTION

As previously discussed, conventional regenerative braking systems and methods in electrified vehicles where the electric motor is mechanically coupled to one or more transmission gears can experience gaps in regenerative braking during gear shifts, which may be noticeable to the driver and/or vehicle occupants.

In existing systems, when the electric motor (mechanically coupled to the transmission) is not available to support coasting and braking, brake torque is not achieved until the brake controller determines a loss of deceleration which amounts to a delay typically noticeable to the driver and/or vehicle occupants. In a hybrid powertrain architecture, the engine could be turned on but only coast torque could be managed through the engine. In these systems, if electric regeneration is ongoing during pedal off scenarios and when the brakes are engaged by the driver followed by a transmission gear shift, unavailability of the electric motor can cause a loss of coasting and braking during the shift.

In cases where the engine can be turned on, braking torque cannot be managed through the running engine, only coast torque could be managed through the engine, but with a delay because it typically takes longer to turn on the engine than it does to perform a gear shift. As a result, braking or coasting torque will be missing for at least an initial part of the gear shift without controlled coordination of the brake controller and the hybrid controller thereby resulting in a lack of smooth and continuous deceleration.

Accordingly, improved regenerative braking systems, method and techniques are provided for vehicle architectures having an electric traction motor coupled to transmission gear(s), such as in a hybrid transmission. These techniques provide improved regenerative braking through coordination of a master controller with a brake controller to achieve smooth and continuous deceleration, even during mechanical gear shifting of the transmission.

Figure 1:
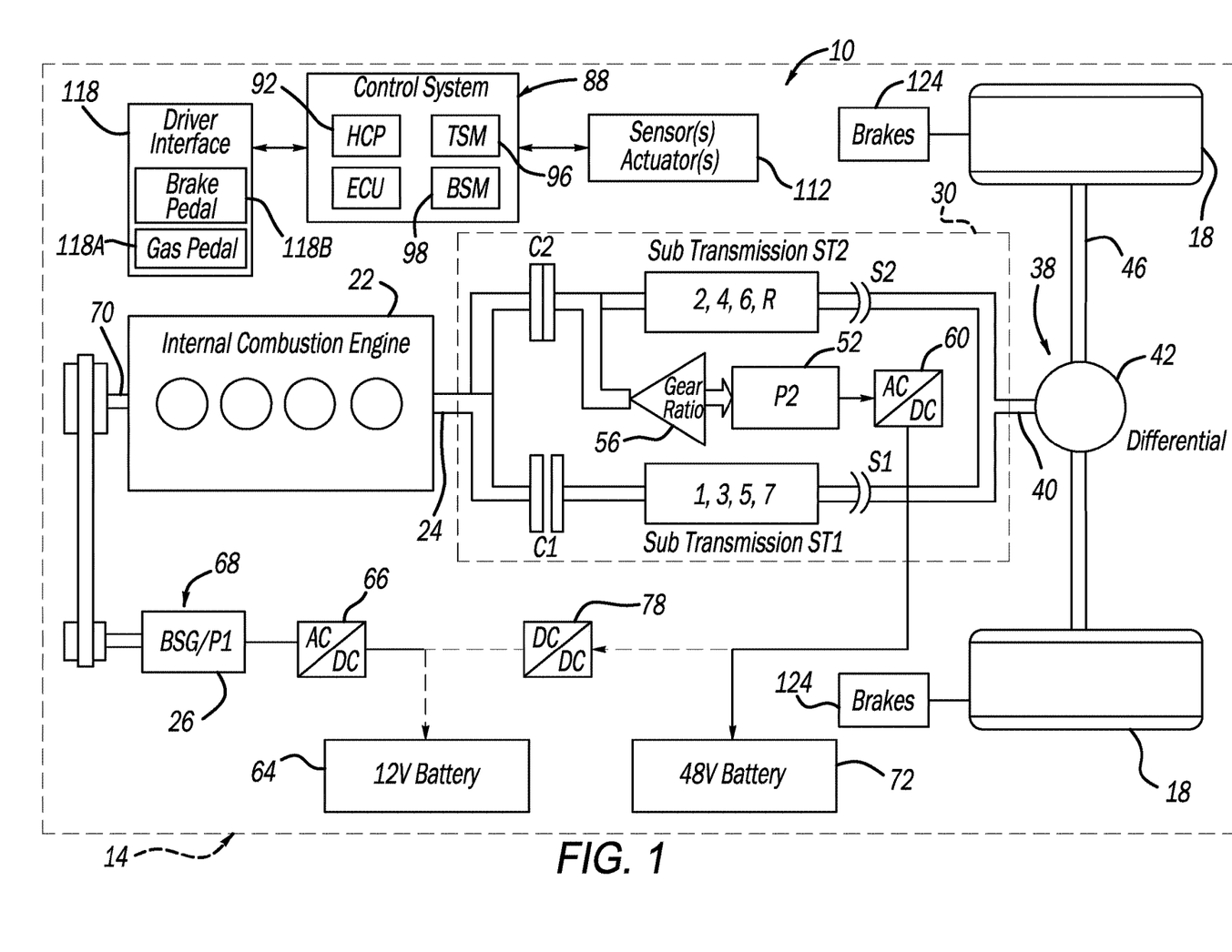
FIG. 1 illustrates an example schematic representation of a mild hybrid electric vehicle architecture including a dual clutch hybrid transmission according to the principles of the present application.

FIG. 1 illustrates an example mild hybrid powertrain architecture 10 for an example mild hybrid electric vehicle 14. It will be appreciated that while only two wheels 18 of the vehicle are illustrated, the vehicle 14 may 14 may include four or more wheels, as may be desired. In the example vehicle shown, the hybrid powertrain architecture 10 includes an engine 22, a first electric motor 26 rotationally coupled thereto, a hybrid dual clutch transmission 30 coupled to the engine 22 via an output and to a driveline system 38.

In the example architecture illustrated, the engine 22 may be an internal combustion engine 22 and may include four cylinders. It will be appreciated, however, that the engine 22 may include various configurations and number of cylinders, such as a v-type configuration and six or eight cylinders, for example. The driveline system 38 may include various components including, for example, a driveshaft 40 an electric drive module or differential 42, a rear axle 46 and the rear wheels 18. While the example architecture illustrates the differential 42, it will be appreciated that other components, such as the electric drive module, may also be utilized.

The dual clutch hybrid transmission 30 includes, in general, dual clutches C1 and C2 associated with respective internal sub-transmissions ST1 and ST2. In the example illustrated, odd transmission gears are associated with sub-transmission ST1 and even gears are associated with sub-transmission ST2. Each sub-transmission ST1, ST2 also includes controllable synchronizers S1, S2 that include the capability to, among other things, couple and decouple the sub-transmissions ST1, ST2 from the driveline system 38. A P2 or P2.5 high voltage electric motor 52 is provided in or associated with the dual clutch transmission 30 and may be associated with a gear reducer 56 and an AC/DC converter 60.

The hybrid powertrain may be in the form of the mild hybrid electric vehicle powertrain discussed above and may include a low voltage battery or battery system 64, such as a 12V battery, which may be associated with a belt starter generator (BSG) unit 68. The BSG unit 68 includes the low voltage P1f motor 26 which is powered by the low voltage battery 64 through an AC/DC converter 66. The BSG unit 68 is coupled to the engine 22, typically via a crankshaft 70. It will be appreciated that while the discussion will continue with reference to the mild hybrid electric vehicle (MHEV) architecture 10, the present disclosure is also applicable to a hybrid electric vehicle (HEV) and an electric vehicle (EV). Such vehicles may hereinafter be referred to individually or collectively as an "electrified vehicle".

The high voltage P2 motor 52 is electrically coupled to and powered by a high voltage battery or battery system 72 and is also electrically coupled to the AC/DC converter 60 and a DC/DC boost converter 78. In one example implementation, the DC/DC boost converter 78 is a unidirectional DC/DC converter and this together with the low voltage p1f motor 26 of the BSG unit 68 prevents the BSG unit 68 from being able to provide charging for the high voltage battery system 72.

The hybrid powertrain also includes a control system 88. In one example implementation, the control system 88 includes a hybrid controller or control unit (HCP) 92, a transmission controller or control unit or module (TCM) 96, a brake controller or control unit or module (BSM) 98 and an engine controller or control unit (ECM) 102 in communication with the various components and systems of the hybrid vehicle powertrain and each other via a communication network 106, such as CAN communication. In one exemplary implementation, the HCP 92 also functions or serves as a master controller over the other control units, including the TCM 96. The HCP 92, TCM 96 and BSM 98 may be referred to herein individually or collectively as the control system 88.

While the discussion will continue with reference to the example mild hybrid electric vehicle architecture 10 shown in FIG. 1, it will be appreciated that the control strategies and associated systems, methods and/or techniques discussed herein apply to vehicles having somewhat different architectures while still including an internal combustion engine, a P2 electric motor, a unidirectional DC/DC boost converter, a low voltage P1f electric motor, an energy storage system, and a gear transmission with controllable connections to the engine and a vehicle driveline.

With additional reference to FIGS. 2A-2C and 3A-3B and continued reference to FIG. 1, example control strategies 200 for improved braking during the hybrid transmission gear shifts will now be discussed in connection with an example use case (illustrated in FIGS. 2A-2C and 3A-3B). The use case sets forth, among other control strategies and interactions, how the master or supervisory controller HCP 92 coordinates with the BSM 98 to achieve smooth and continuous deceleration during transmission gear shifts for the exemplary P1P2.5 vehicle architecture 10. This example use case is based on the vehicle undergoing electric motor regeneration, the engine being in an off state and the hybrid transmission being in fourth gear and shifting to second gear. It will be appreciated however, that this use case is one example of many use cases for different gear shits, etc., and is not to be construed as limiting. Example system behavior for this use case will now be discussed with reference to the vertical lines 1-4 in FIGS. 2A-2C and the flow logic set forth in FIGS. 3A-3B.

Figure 2A:
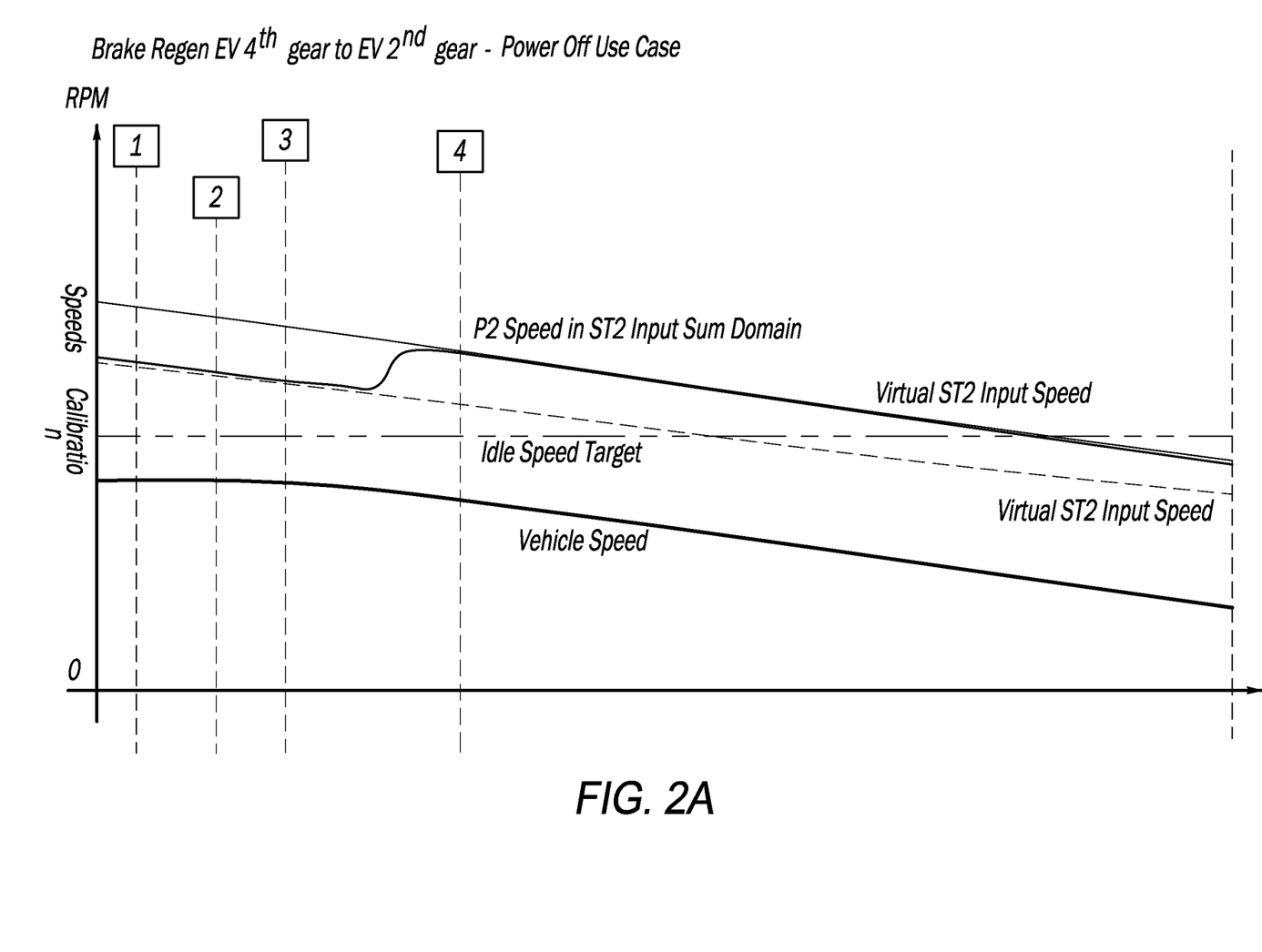
FIGS. 2A-2C illustrate an example use case showing example behavior of torques, speeds and status/coordination of one or more controllers including a brake controller according to the principles of the present application.
Figure 2B:
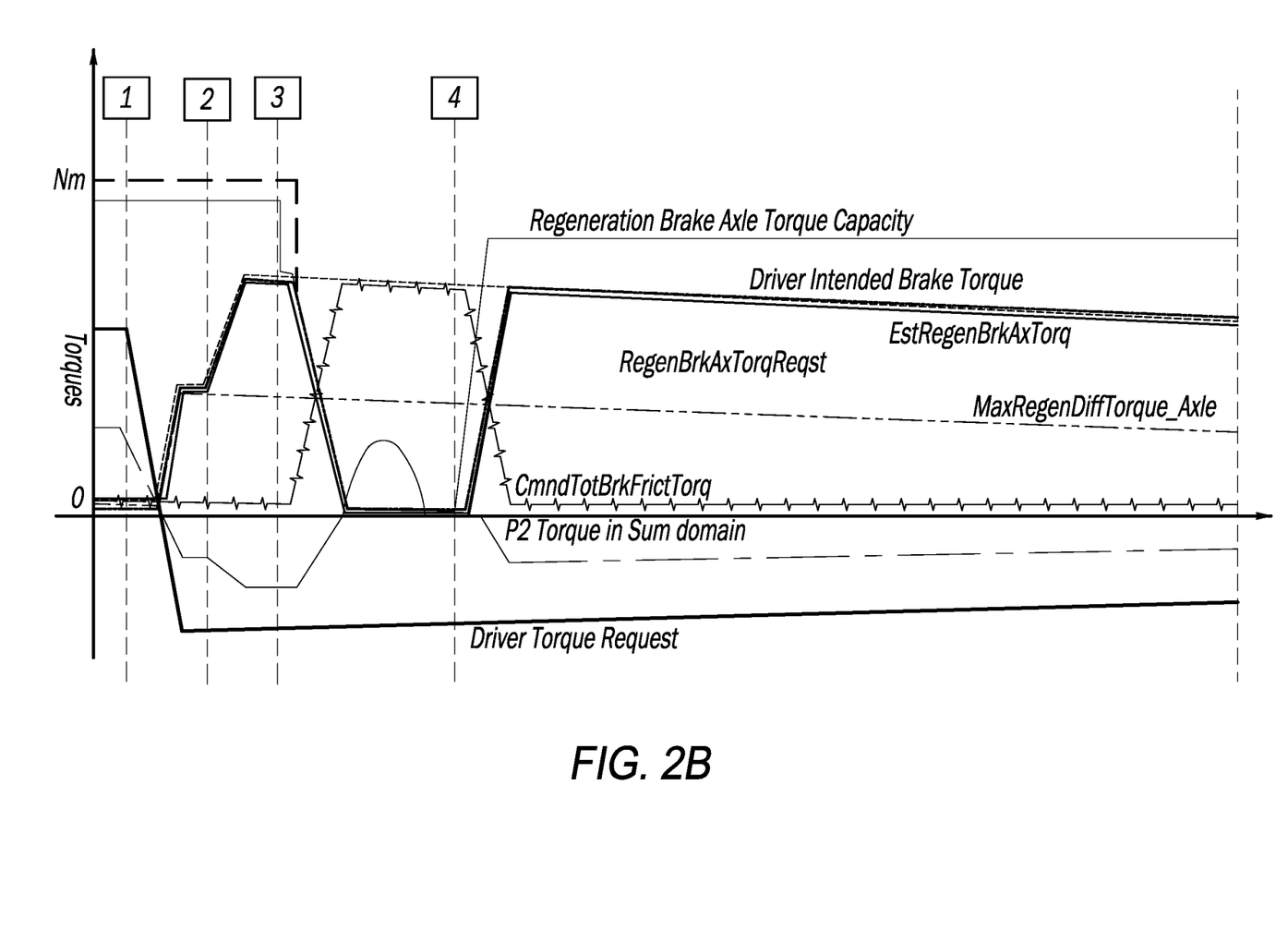
Figure 2C:
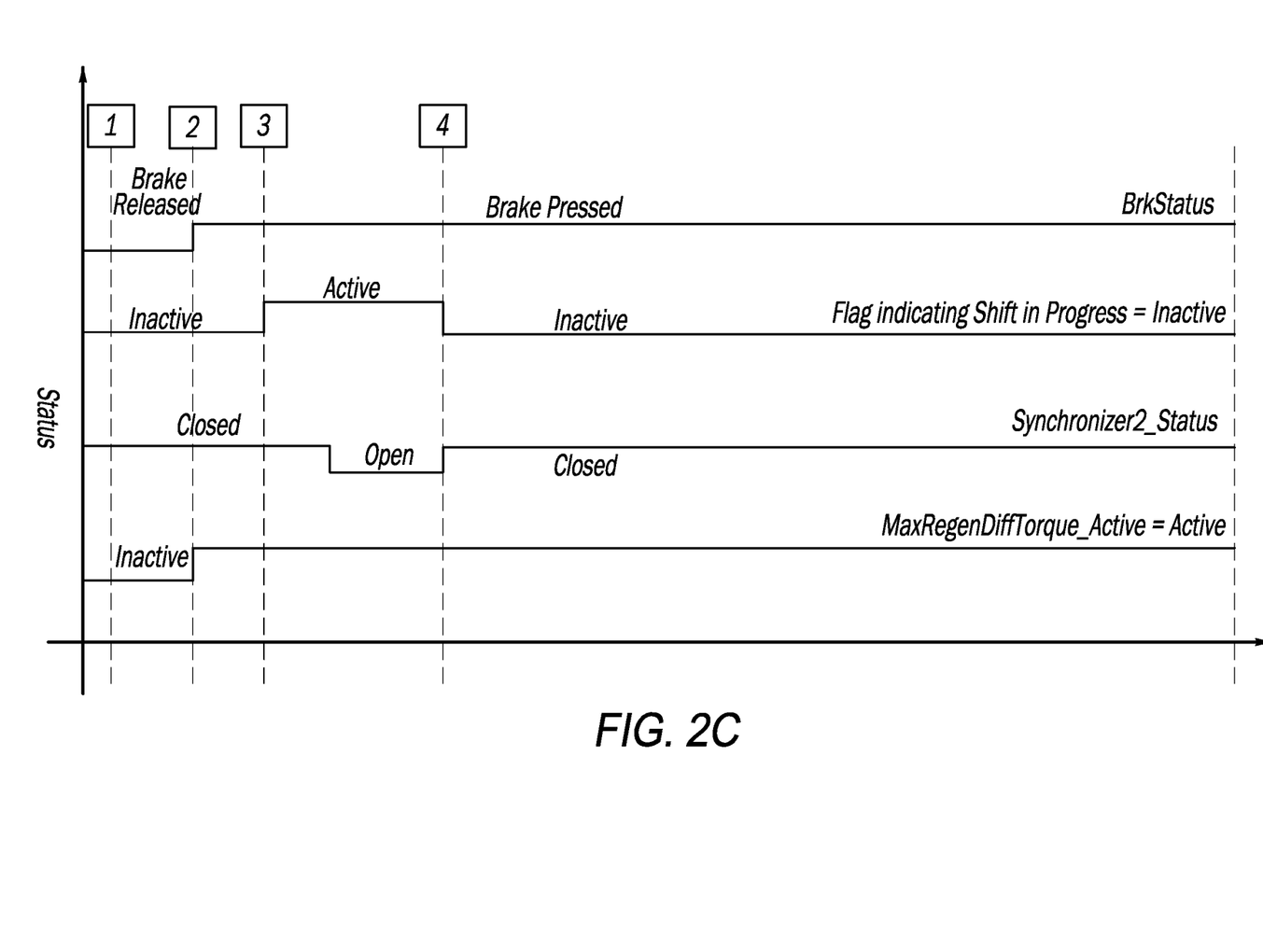
Figure 3A:
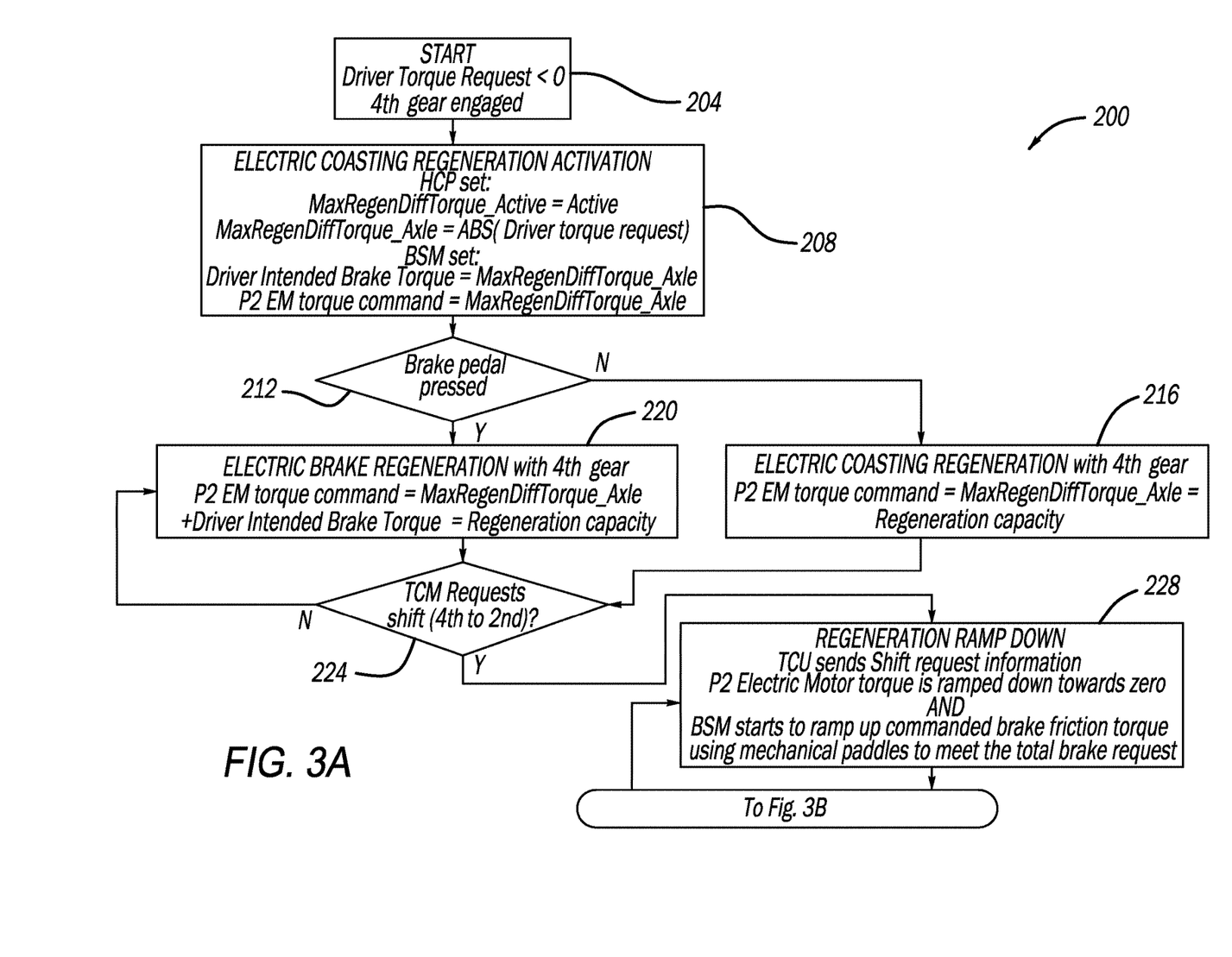
FIGS. 3A-3B illustrate a flow diagram of an example mild hybrid vehicle braking system and method according to the principles of the present application.
Figure 3B:
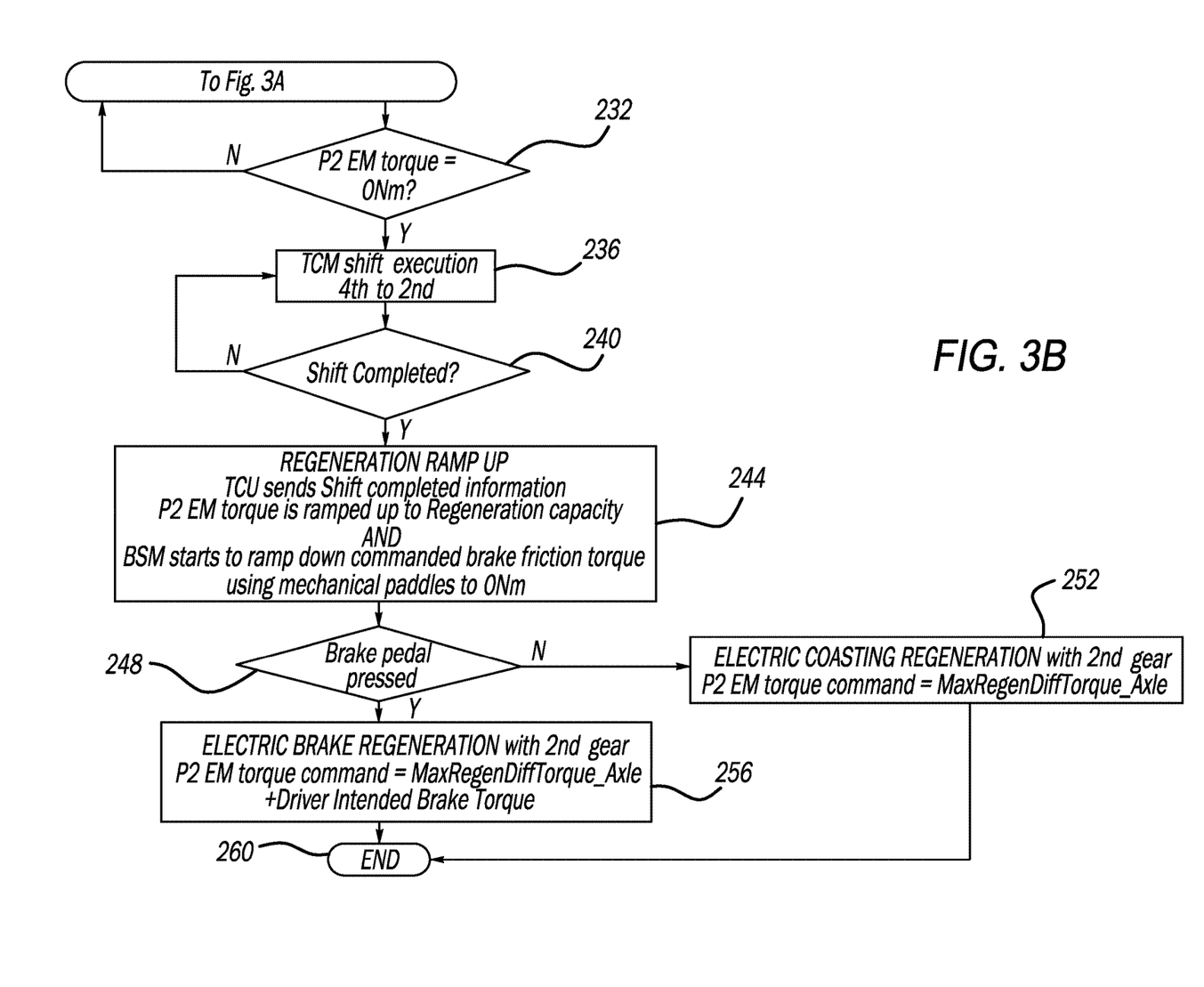

It will be appreciated that while the logic flow set forth in FIGS. 3A-3B is shown in a sequential manner, one or more of the blocks illustrated may occur concurrently or substantially concurrently such that the sequential illustration may be for discussion purposes only and is not intended to be limiting. This can be seen, for example, in FIGS. 2A-2C where one or more events happen concurrently or substantially concurrently relative to one or more of lines 1-4. For example, in one exemplary implementation, which is discussed below, the driver of moving vehicle 14 initially releases the gas pedal 118A, depresses the brake pedal 118B and the HCP in coordination with the TCM determines a downshift is required substantially concurrently or near substantially concurrently.

Early coordination of the HCP with the BSM while the above is happening provides for mitigating or eliminating a delay in activating required braking torque to counteract any acceleration which may be present when the transmission shifts gears. Acceleration may be present because for the transmission to shift gears on the even side of the transmission (e.g., $4^{th}$ to $2^{nd}$ gear) with the powertrain architecture 18, the electric motor is required to be disconnected form the wheels 18 though placing the synchronizer 18 in an open state.

Line 1

The vehicle is in EV mode with the hybrid dual clutch transmission 30 being in fourth gear (EV 4th gear) and the engine 22 being in an off state. The driver releases the gas pedal 118A, and this action triggers electric regeneration via the P2 electric motor, as discussed below. This corresponds to block 204 of FIGS. 3A-3B, where entry or initial conditions are satisfied. A braking torque request may also be received shortly thereafter by the driver's depression of the brake pedal 118B. At 208 of FIGS. 3A-3B, when the Driver Torque Request is <0, the HCP 92 changes MaxRegenDiffTorque_Active from "Inactive" to "Active". With the Driver Torque Request being <0, the HCP 92 also calculates MaxRegenDiffTorque_Axle as an absolute magnitude value of the Driver Torque Request and reports on CAN 106 to the BSM 98. Here, the driver has depressed the brake pedal 118B and the BSM 98 correspondingly reports Driver Intended Brake Torque equals the MaxRegenDiffTorque_Axle on CAN 106. This is one example of the early coordination between the HCP 92 and the BSM 98 so as to mitigate or eliminate any perceivable gap in braking torque during a subsequent transmission shift. Here also, the P2 electric traction motor 52 torque command equals the MaxRegenDiffTorque_Axle.

Line 2

The control system 88 confirms at 212 of FIGS. 3A-3B that the brake pedal 118B has been depressed. If not depressed, at 216 of FIGS. 3A-3B the control system 88 sets the P2 electric motor 52 torque command, which equals the MaxRegenDiffTorque_Axle as the Regeneration Capacity (Regeneration Brake Axle Torque Capacity in FIGS. 2A-2C), as discussed above.

At block 220, with the brake pedal 118B having been depressed, as shown in Line 2 of FIGS. 2A-2C and discussed above, the P2 electric motor is able to regenerate more in EV $4^{the}$ gear to satisfy the brake torque request (shown as Driver Intended Brake Torque). It will be appreciated that in electrified vehicles, a depression of the brake pedal 118B results in a corresponding brake torque request (e.g., Driver Intended Brake Torque), which may be honored or satisfied by one or both of the fiction brakes 124 and the electric motor 52. At 220 of FIGS. 3A-3B, the regeneration capacity is set to the P2 electric motor 52 torque command, which equals the MaxRegenDiffTorque_Axle, plus the Driver Intended Brake Torque. This Regeneration Capacity (Regeneration Brake Axle Torque Capacity) is greater than as calculated at block 216.

Line 3

At 224 of FIGS. 3A-3B, the TCM 96 initiates or commands a transmission gear change on the even shaft of the sub-transmission ST2. This can be as a result of, for example, transmission 30 and/or TCM 98 shift logic determining a downshift will be required based on, for example, a slowing speed of the vehicle 14. If the gear shift does not happen or is not honored, the process returns to block 220. If the gear shift is honored, as shown in FIGS. 2A-2C, the HCP 92 receives this information via another interface on the CAN 106 (gears, shift type) and sends a flag (see 228 of FIGS. 3A-3B) indicating the transmission gear shift is in progress which equals "active" to the BSM 98 on the CAN 106. The synchronizer S2 is controlled to the neutral or open state, as shown in FIGS. 2A-2C.

As briefly mentioned above, for the subject powertrain architecture 18, downshifting involving an even gear requires placing the synchronizer S2 temporarily in a neutral condition, which temporarily disconnects the traction motor 52 from the wheels and thus the motor regeneration torque contribution to the total braking torque. Coordination with the BSM and the associated friction brakes 124 is required bridge this gap. If the coordination is not early in the subject process, then there will likely be a perceivable feel (e.g., acceleration) to vehicle occupants during the shift which is undesirable and often experienced in existing electrified vehicles.

Continuing at 228, the HCP 92 then ramps down the Regeneration Brake Axle Torque Capacity to zero (see FIGS. 2A-2C). This in turn forces the regeneration request (RegenBrkAxTorqReqst) from the BSM 98 to the HCP 92 to follow the Regeneration Capacity towards zero. This causes the Estimated Regeneration Brake Axle Torque (EstRegenBrkAxTorq in FIGS. 2A-2C) from the HCP 92 to follow the Regeneration Capacity towards 0 and the P2 electric motor 52 torque is ramped down towards zero (as it will be or is being disconnected form the vehicle wheels). The BSM 98 also starts to ramp up commanded total brake friction torque (CmndTotBrkFrictTorq in FIGS. 2A-2C) towards the Driver Intended Brake Torque to meet the total brake request (i.e., compensating for the lack of contribution by the electric motor 52 to the total braking torque). At 232, the control system 88 determines whether or not the P2 electric motor 52 torque is 0 N/m. If not, the process returns to block 228. If yes, the process continues to block 236 of FIGS. 3A-3B.

Line 4

At 236, the TCM 96 closes the even gear synchronizer S2 and the even gear shift (e.g., $4^{th}$ to $2^{nd}$ gear) is completed. The TCM 96 signals the same on the CAN 106. At 240 of FIGS. 3A-3B, the control system 88 confirms the shift has been completed. If not, the process returns to block 236. If yes, the process continues to block 244.

At 244 of FIGS. 3A-3B, the HCP 92 starts to ramp up Regeneration Brake Axle Torque Capacity to its original value before the gear shift. The HCP 92 obtains this information via another interface on the CAN 106 (gears, shift type) and sends a flag indicating gear shift in progress equals inactive to the BSM 98 on the CAN 106. The BSM 98 starts to ramp down CmndTotBrkFrictTorq towards 0 Nm while ramping up RegenBrkAxTorqReqst toward Driver Intended Brake Torque. The HCP 92 signal EstRegenBrkAxTorq follows RegenBrkAxTorqReqst. The BSM 98 sets CmndTotBrkFrictTorq to 0 Nm and RegenBrkAxTorqReqst equals Driver Intended Brake Torque. Blocks 248, 252, 256 and 260 summarize how the process would continue based on whether or not the driver would depress the brake pedal 118B again while the vehicle 14 is moving with the transmission 30 in second gear.

In summary, previous solutions cannot achieve continuous and smooth deceleration when the driver requests braking or coasting during a transmission gear shift where the transmission gears are mechanically connected to electric motor that is used for regeneration. This results in a gap in deceleration noticeable by the driver and/or vehicle occupants. The systems, method and techniques and/or control strategies described herein advantageously use mechanical friction brakes via early coordination of the HCP and the BSM to achieve continuous and smooth deceleration during shifting of gears connected to the electric motor since electrical regeneration is not possible when the electric motor is disconnected from the wheels during the gear shift. The improved approach discussed herein introduces a new strategy to blend in mechanical friction brakes early in the process in a controlled coordinated way among the hybrid, transmission and brake controllers to provide the continuous and smooth vehicle deceleration.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

It will be appreciated that the term "controller" or "control system" (as well as "module" and "unit") as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Some portions of the above description may present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electrified vehicle, comprising:
  a transmission including multiple shiftable gears, an electric motor coupled for common rotation therewith, and a synchronizer controllable to couple and decouple the transmission from wheels of the vehicle;
  friction brakes;
  a control system including a hybrid control unit (HCP), a brake control unit (BSM) and a transmission control unit (TCM), wherein the HCP functions as a supervisory controller over the TCM and the BSM;
  wherein the HCP is configured to coordinate control among the TCM and BSM to compensate for unavailability of electric motor regeneration torque during an upcoming transmission gear shift, including:
    based on determining the vehicle is in a coast condition, the HCP coordinates with the TCM to set a first level of electric motor regeneration torque in connection with the transmission being in an initial gear, the first level of electric motor regeneration torque being equal to a first level of total braking torque;
    based on a driver braking torque request being received:
      the HCP coordinates with the BSM to determine an amount of driver intended brake torque and the first level of total braking torque is increased by the determined amount of driver intended brake torque to a second level of total braking torque;
      the HCP coordinates with the TCM to raise a level of electric motor regeneration torque from the first level to a second level matching the second level of total braking torque;
    based upon a shift request being communicated by the TCM, the HCP:
      coordinates with the BSM and the TCM to ramp down the second level of electric motor regeneration torque while commanding a corresponding increase in friction brake torque to maintain the second level of total braking torque; and
      coordinates with the TCM to execute the upcoming gear shift from the initial gear to another gear of the second sub-transmission;
  wherein the transmission includes a dual clutch transmission having:
    first and second sub-transmissions having respective first and second clutches and first and second synchronizers, the first and second synchronizers being controllable to couple and decouple the respective first and second sub-transmissions from wheels of the vehicle; and
    the electric motor being rotationally coupled to the second sub-transmission for common rotation therewith;
  wherein the upcoming gear shift involves a gear of the second sub-transmission, and wherein the first level of electric motor regeneration torque is set in connection with the second sub-transmission being in an initial gear; and
  wherein the initial gear and the another gear are both in the second sub-transmission.

2. The electrified vehicle of claim 1, wherein based upon a shift request being communicated by the TCM, the HCP:
  coordinates with the BSM and the TCM to ramp down the second level of electric motor regeneration torque to zero; and
  commands the second synchronizer to an open or neutral state to disconnect the second sub-transmission from the wheels to facilitate the upcoming gear shift.

3. The electrified vehicle of claim 2, wherein the HCP coordinates the second synchronizer being commanded to the open or neutral state by the TCM once the second level of electric motor regeneration torque is ramped down to zero.

4. The electrified vehicle of claim 2, wherein the HCP coordinates with the BSM and the TCM to command the increase in friction brake torque by the friction brakes to arrive at and maintain the second level of total braking torque at substantially a same time as the electric motor regeneration torque is ramped down to zero and the second synchronizer is commanded to the open or neutral state.

5. The electrified vehicle of claim 4, wherein upon or after the upcoming gear shift from the initial gear to another gear is executed, the HCP coordinates with the BSM to ramp down the commanded friction brake torque to zero.

6. The electrified vehicle of claim 4, wherein after the upcoming gear shift from the initial gear to another gear is executed, the HCP coordinates with the TCM to command the second synchronizer to a closed state thereby coupling the second sub-transmission to the wheels.

7. The electrified vehicle of claim 1, wherein determining the vehicle is in a coast condition includes receiving a signal indicative of a gas pedal being released to a non-depressed state.

8. The electrified vehicle of claim 1, wherein the determined driver intended brake torque is a function of a depression amount of a brake pedal of the vehicle.

9. The electrified vehicle of claim 1, wherein the electrified vehicle is a mild hybrid electric vehicle.

10. The electrified vehicle of claim 1, wherein the electrified vehicle is a hybrid electric vehicle.

11. The electrified vehicle of claim 1, wherein the electrified vehicle is a battery electric vehicle.

* * * * *